Feb. 13, 1951

J. P. KINZER 2,541,925

ELECTRICAL SPACE RESONATOR HAVING A HIGH RATIO BETWEEN QUALITY FACTOR AND VOLUME

Filed April 13, 1945

4 Sheets-Sheet 1

INVENTOR
J. P. KINZER
BY E. V. Griggs
ATTORNEY

Feb. 13, 1951 J. P. KINZER 2,541,925

ELECTRICAL SPACE RESONATOR HAVING A HIGH RATIO BETWEEN QUALITY FACTOR AND VOLUME

Filed April 13, 1945 4 Sheets-Sheet 2

INVENTOR
J. P. KINZER
BY E. V. Griggs
ATTORNEY

INVENTOR
J. P. KINZER
BY E. V. Griggs
ATTORNEY

INVENTOR
J. P. KINZER
BY E. V. Griggs
ATTORNEY

Patented Feb. 13, 1951 2,541,925

UNITED STATES PATENT OFFICE 2,541,925

ELECTRICAL SPACE RESONATOR HAVING A HIGH RATIO BETWEEN QUALITY FACTOR AND VOLUME

John P. Kinzer, Ridgefield, N. J., assignor to Bell Telephone Laboratories, Incorporated, New York, N. Y., a corporation of New York Application April 13, 1945, Serial No. 588,201

4 Claims. (Cl. 178—44)

This invention relates to electrical space resonators having a high ratio between quality factor and volume.

An object of the invention is to provide an electrical resonance chamber tunable over a range of frequencies for a desired mode of oscillation and so proportioned as to have a minimum of unwanted modes of oscillation within that range.

Another object of the invention is to provide a high Q electrical resonance chamber having optimum dimensions from the standpoint of avoiding interfering modes of oscillation.

Another object of the invention is to provide a cylindrical resonator having a minimum volume for a given Q.

Another object of the invention is to provide a cylindrical resonator having a maximum Q where the frequency, the interior surface material of the resonator and the volume of the resonator have each been prescribed.

A further object of the invention is to provide a tunable cylindrical resonator with coupling means which shall not interfere in any way with the tuning operation and which shall be relatively free from the effects of that operation.

A quantity which is of very great interest in connection with cavity resonators is the quality factor, Q, which may be defined in terms of the ratio of the total energy stored up in the electromagnetic field within the resonator to the energy dissipated during each cycle.

$$Q=2\pi\frac{\text{energy stored}}{\text{energy lost per cycle}} \qquad (1)$$

The "ring time" during which such a resonator will continue to oscillate after termination of the excitation is roughly proportional to Q.

If the material of which the cavity resonator is made were perfectly conducting the fields would be entirely confined to the space within the resonator there would be no losses and the Q would be infinite. Actually, however, the fields do penetrate the inner surface slightly giving rise to currents which result in energy loss. The "skin depth," $\delta$, is therefore an important factor in dealing with Q. The skin depth is defined as that distance such that if the current were uniformly distributed over that depth the losses would be the same as in the actual situation where the current falls off exponentially with distance below the surface. For non-magnetic materials the value of $\delta$ is given by $$\delta=\frac{1}{2\pi}\sqrt{\frac{\rho\times10^9}{f}}\text{ cm.} \qquad (2)$$

where $\rho$ is resistivity of the cavity wall in ohm-cm. and $f$ is frequency measured in cps.

In many applications and particularly in frequency ranges of the order of 10,000 megacycles (3 centimeters wavelength) the volume of resonance chambers may be so great that large numbers of extraneous oscillations may occur. In practical applications of a resonant cavity the conditions of operation may require high magnitudes of Q which can be attained only by the use of high order modes. The dimensions of the cavity then become large compared to the wavelength. The number of possible resonances and hence of possible extraneous or undesired oscillations is primarily a function of the volume of the cavity and increases with increasing dimensions. The difficulty of suppressing certain of these extraneous oscillations which may interfere with the desired operation makes it desirable to keep the cavity as small as possible consistent with meeting the requirement of high Q so as to restrict the number of extraneous modes. This leads to the consideration of possible expedients for reducing the volume of the cavity resonator while at the same time attaining the preassigned Q.

The volume of a cavity resonator also is a very rough measure of its weight and of the space which must be provided for it. These factors add to the desirability of reducing the volume of the resonator as far as is consistent with obtaining the requisite electrical characteristics.

In the course of a study directed toward reduction of the diameter of a resonance chamber so as to reduce the number of unwanted modes of oscillation it transpired that with reduction of the diameter Q was also reduced but that the reduction in Q was much les than that expected. This led to the discovery that there is a minimum volume of resonance chamber capable of operating at a given Q and that this reduced volume is accompanied with relatively few extraneous modes of oscillation.

In accordance with the invention the dimensions of a minimum volume resonator are calculated by the use of graphs prepared as presumed continuous functions of the relations between Q, $\lambda$ the free space wave length, $\delta$ the skin depth of the material to be used at that particular wavelength, D the internal diameter of the cylindrical cavity, L the length of the cylindrical cavity and $n$ the index of the mode denoting the number of half wavelength variations of field along the axis of the cylinder. From these graphs a magnitude of $n$ is determined. Since $n$ must be an integer the nearest integral value is chosen and the diameter and length of the cylinder are then obtained by a very simple application of the graphs.

In the drawing

Fig. 1 shows graphs of the relationship between $$\frac{\lambda}{\delta}$$

and frequency for copper, aluminum and brass respectively over a wide frequency range;

each with reference to $$Q\frac{\delta}{\lambda}$$

Figures 4, 5, 6, 7:
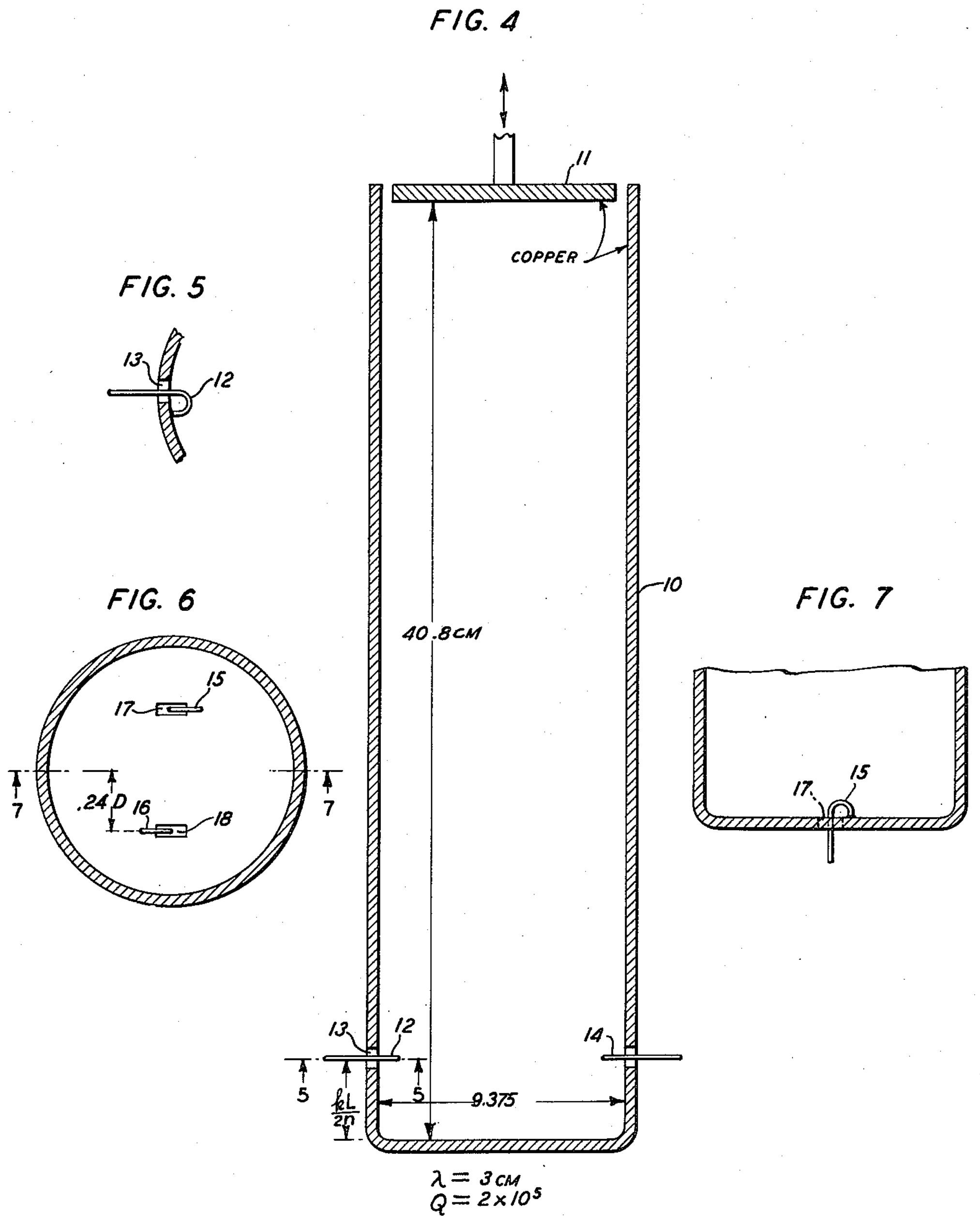

Fig. 4 shows schematically the structural proportions of a cylindrical cavity resonator providing a minimum volume for a definite preassigned Q in accordance with the invention;

Fig. 5 shows a sectional detail along the plane perpendicular to the longitudinal axis through the line 5—5 of Fig. 4;

Fig. 6 is a bottom plan view of an alternative coupling to the resonator of Fig. 4, as viewed from within the resonator; and Fig. 7 is a section along the line 7—7 of Fig. 6 in the direction of the arrows.

By an involved mathematical process the details of which are unnecessary for an elucidation of this invention and are quite too involved to warrant their presentation in this specification it may be shown that for a cylindrical resonator operation in the $TE_{01n}$ mode permits the smallest volume for an assigned Q and free space wavelength $\lambda$. Moreover, it may be shown, as disclosed in the Bell System Technical Journal, July 1947, pages 410 through 419 in an article by J. P. Kinzer and I. G. Wilson entitled "Some Results on Cylindrical Cavity Resonators," that for such $TE_{01n}$ mode oscillations the optimum values of $n$, D and L are recoverable from the equations:

$$n=\frac{1.626 \sin \Phi}{\cos^3 \Phi} \qquad (3)$$

in which $\Phi$ is a solution of the transcendental equation $$5 \cos^3 \Phi - 3 \cos^5 \Phi = 1.220\frac{\lambda}{\delta Q} \qquad (4)$$

$$\frac{D}{\lambda}=1.220 \sec \Phi \qquad (5)$$

$$\frac{L}{\lambda}=0.813 \sec^3 \Phi \qquad (6)$$

The use of the foregoing equations to provide suitable design graphs and the employment of the graphs for obtaining the actual dimensions of a cylindrical cavity resonator may be readily illustrated by the problem of designing a cavity resonator to have a preassigned $Q=2\times10^5$ for a wavelength of 3 centimeters, that is, a frequency of approximately 10,000 megacycles. Assume that the material of the inner surface of the resonator is specified as copper.

Figure 1:
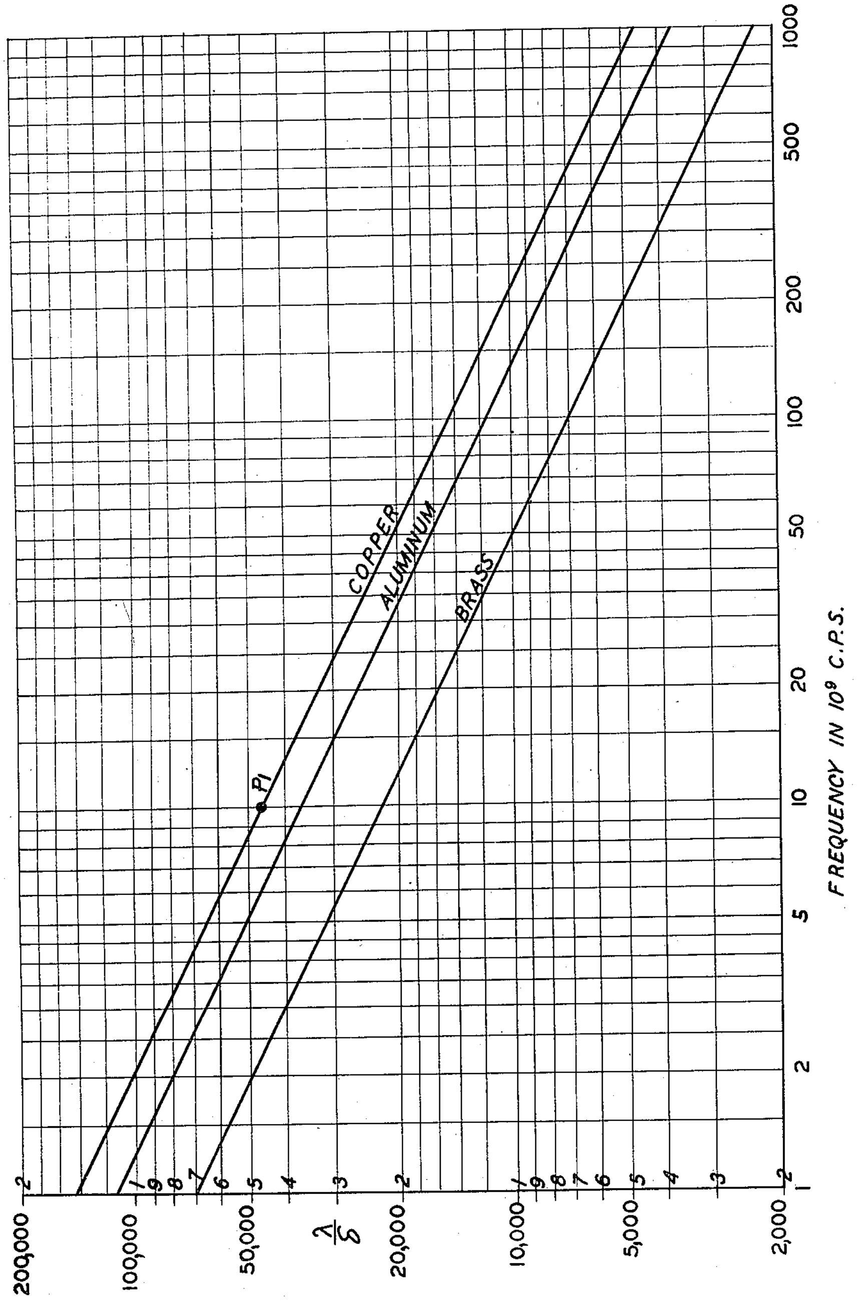

From the graph of Fig. 1 which may be plotted from Equation 2 it may be observed that at the wavelength of 3 centimeters or a frequency of substantially $10\times10^9$, corresponding to the point $P_1$ on the upper graph for copper, $$\frac{\lambda}{\delta}=45,500$$

Since $Q=2\times10^5$, $$Q\frac{\delta}{\lambda}$$

may be readily calculated to be 4.4.

Figure 2:
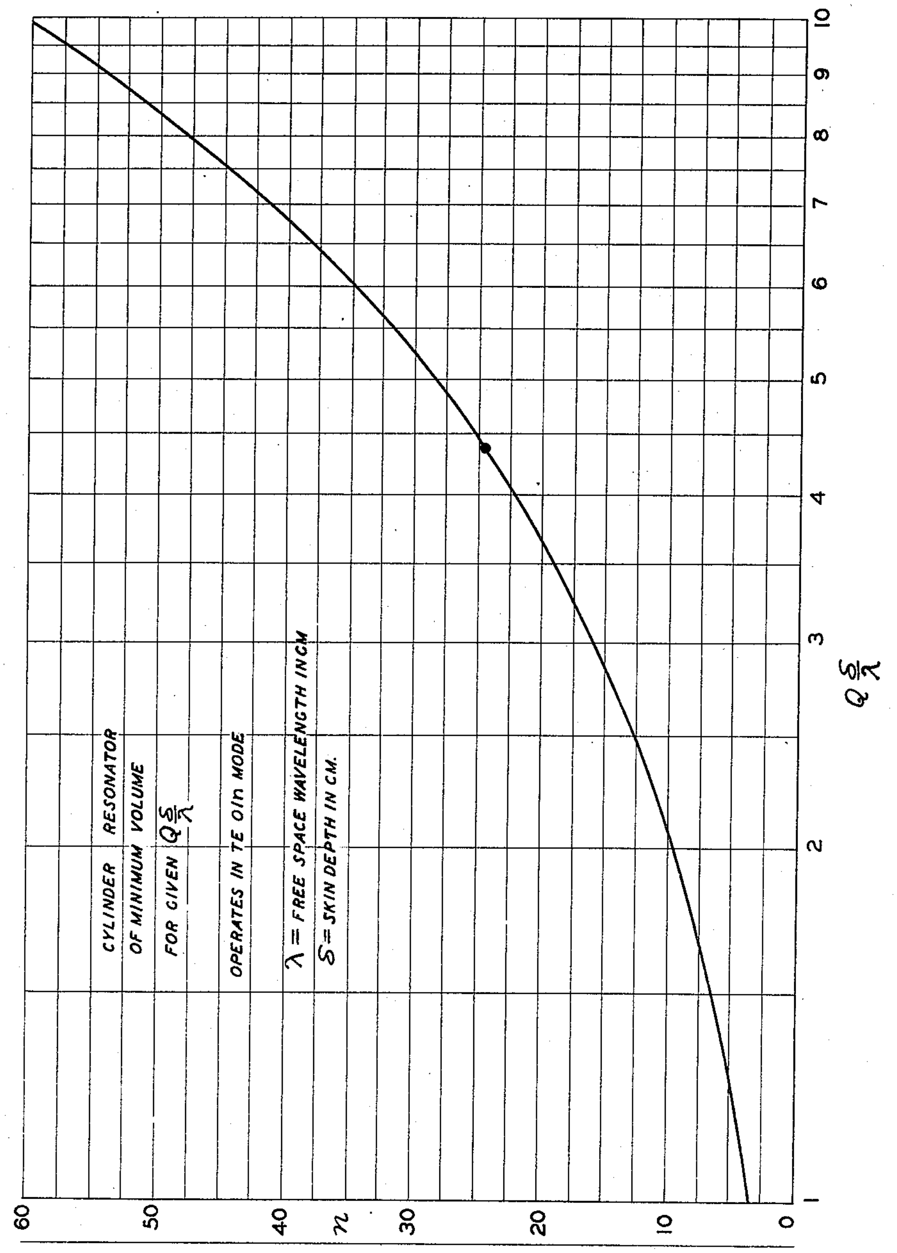
Fig. 2 is a graph of the relation between $n$, the index number of the mode of oscillation, and $$Q\frac{\delta}{\lambda}$$

We now turn to Fig. 2 which shows the relation of $n$ to $$Q\frac{\delta}{\lambda}$$

as derived from Equations 3 and 4. Although the graph of Fig. 2 presents a continuous function, the actual values of the index $n$ in cavity resonators are, of course, restricted by physical considerations to integers. Hence a strictly accurate representation of the functional dependence of $n$ on $$Q\frac{\delta}{\lambda}$$

in the minimum $V/Q$ cavity under discussion) would consist of a set of discrete points, one for each value of $n$. However, the continuous function plotted in Fig. 2 is such that its values for $n$ integral coincides with the values of the true discontinuous function, that is, it passes through all the discrete points to which reference has been made.

Taking the value of 4.4 for $$Q\frac{\delta}{\lambda}$$

the corresponding magnitude of $n$ as ascertained from the graph of Fig. 2 is 24.5. In general, one should choose as the actual value of $n$ the nearest integral to the magnitude obtained from the graph. In this case our choice will lie between $n=24$ and $n=25$ and we shall select the higher value of $n$ since in that direction, although there is a disadvantage that the volume is greater, there is compensation that the value of Q is higher.

Now that $n$ has been finally set at 25 we return to Fig. 2 to find the actual corresponding $$Q\frac{\delta}{\lambda}$$

Figure 3:
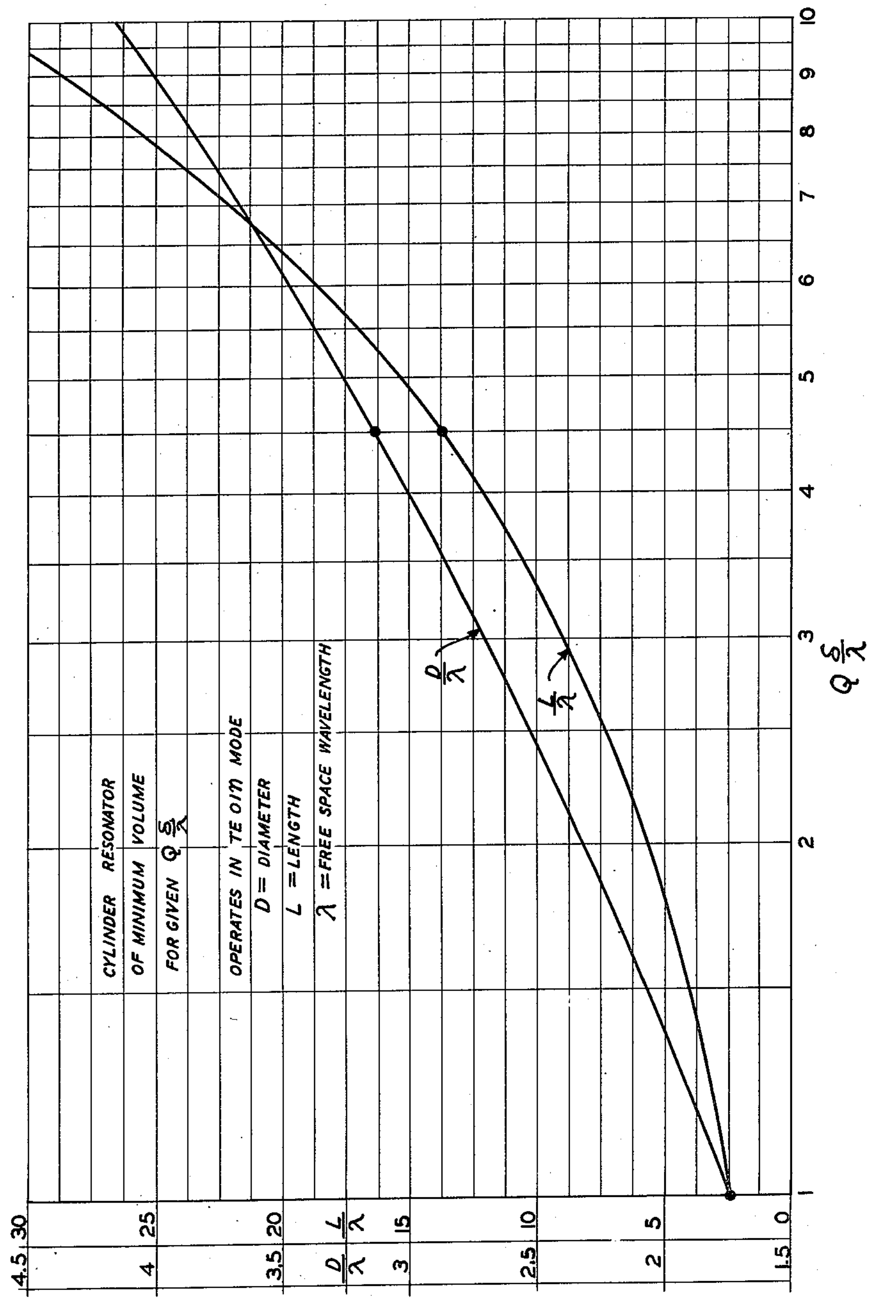
Fig. 3 shows graphs respectively of $$\frac{D}{\lambda} \text{ and } \frac{L}{\lambda}$$

It turns out to be precisely 4.5. The diameter D and the length L may now be readily determined by reference to Fig. 3 in which $$\frac{D}{\lambda} \text{ and } \frac{L}{\lambda}$$

have been plotted in terms of $$Q\frac{\delta}{\lambda}$$

from Equations 5 and 6. From the upper graph we find that for $$Q\frac{\delta}{\lambda}=4.5;\ \frac{D}{\lambda}=3.125$$

or with $\lambda=3$ centimeters, D=9.375 centimeters. From the lower graph, for the same magnitude of $$Q\frac{\delta}{\lambda},\ \frac{L}{\lambda} \text{ is } 13.62$$

or L is 40.8 centimeters. To facilitate manufacture it may be expedient to choose a magnitude for D which while conforming to the principle of the invention may involve a slight comprise to permit use of standard commercial tubing in construction of the resonator.

The schematic structure of the resulting cavity resonator is shown in Fig. 4 in which the cylindrical structure 10, of which at least the interior surface is of copper, has an interior diameter D of 9.375 centimeters. The length L measured from the inner copper surface of tuning piston 11 is 40.8 centimeters. Such a device operating at a wavelength of 3 centimeters with $TE_{0,1,25}$ mode oscillations will exhibit the required Q.

In use as a resonant selective device the cavity resonator may be provided with an input coupling loop 12 introduced through a narrow slot aperture 13 in the wall of the resonator at a point remote from the tuner 11. At another point, remote from the coupling loop 12, a second output coupling loop 14 may be provided. Loops 12 and 14 extend in a plane transverse to the longitudinal axis of the resonator as will be apparent from Fig. 5 which shows a detail of the structure including input loop 12. The plane of the loops 12 and 14 may be removed from the inner surface of the lower end of the resonator by a distance $d$ which measures the separation of the planes of maximum intensity $TE_0$ field from the end surface as determined by the equation $$d=\frac{kL}{2n}$$

In this equation $k$ is an odd integer and with $L=40$ centimeters and $n=25$ as in Fig. 4, $d$ may have the values 0.8 centimeter, 2.4 centimeters or 4 centimeters, etc. It is preferable to place these loops at one of the maximum intensity field planes most remote from the tuner disc 11 since this renders the loops relatively unaffected by variations in the position of that disc. In an alternative structure shown in Figs. 6 and 7, the input and output loops 15 and 16 respectively are introduced through narrow slots 17 and 18 in the lower end of the resonator. These apertures each extend in a tangential direction and are located at a point substantially midway between the center and the periphery of the end, at which point the intensity of the electric vector is a maximum. Theoretically, for best results these apertures should be located at positions such that their centers are at a distance of 0.24D from the central axis of the resonator at which maximum coupling to $TE_{01n}$ modes may be had. The resulting structure serves to give the required Q at the preassigned frequency and for the interior surface prescribed. Moreover, it does this with a minimum of volume which, in general, means a corresponding saving in material, in the masses which must be lifted or moved, in the space required and in the cost of the apparatus. Moreover, there is attained an additional advantage other than these which, in most cases, is still more important, that is, with the reduction in volume a very great reduction in the number of additional resonances is effected, making it possible in many cases to avoid unwanted resonances which cause serious interference with the results desired.

It will be apparent that the invention is capable of utilization to take advantage of various design factors from which a choice is possible. The choice may lie between certain materials from which the resonator is constructed or with which its interior surface is coated to achieve a desirable skin depth or in utilization of the minimum Q which may be satisfactory for a given set of circumstances.

What is claimed is:

1. A cylindrical resonator comprising a hollow shell of electrically conducting material designed to have a preassigned quality factor Q at a given frequency $f$ for oscillations of $TE_{01n}$ mode, the material presenting a skin depth $\delta$ at its inner surface and the magnitudes of the length L and diameter D of the cylinder being substantially in accordance with $$L=\lambda(0.813 \sec^3\varphi)$$
$$D=\lambda(1.220 \sec \varphi)$$

where $\lambda$ is the free space wavelength at frequency $f$ and $\varphi$ is a solution of the transcendental equation $$5 \cos^3 \varphi-3 \cos^5 \varphi=1.220\frac{\lambda}{\delta Q}$$

whereby for a specified $f$ and Q, the volume of the resonator is a minimum.

2. A cylindrical resonator in accordance with claim 1 characterized in this, that one end of the hollow shell is closed by a movable tuning piston which is displaceable longitudinally of the chamber from a minimum frequency position at which the length of the internal space is L, throughout a range of positions corresponding to higher frequencies.

3. A cylindrical resonator comprising a hollow shell of electrically conducting material designed for a minimum internal volume under the conditions of preassigned frequency $f$ of transverse electric oscillations of $TE_{01n}$ mode, preassigned quality factor Q and preselected conducting material for which the skin depth is $\delta$ where $n$, the interior length L and the interior diameter D of the hollow shell are determined for minimum volume of resonator by $$n=\frac{1.626 \sin \varphi}{\cos^3 \varphi}$$

to the nearest integral value $$\frac{D}{\lambda}=1.220 \sec \varphi$$

$$\frac{L}{\lambda}=0.813 \sec^3 \varphi$$

with $\lambda$ signifying the free space length at frequency $f$ and $\varphi$ being a solution of the transcendental equation $$5 \cos^3 \varphi-3 \cos^5 \varphi=1.220\frac{\lambda}{\delta Q}$$

4. The structure of claim 3, wherein said resonator is provided with a tuning piston at one end and a flat plate at the opposite end, coupling loops inserted in said resonator in a plane of maximum field intensity for $TE_0$ modes and at a distance $$d=\frac{kL}{2n}$$

from the end plate of said resonator, where $k$ is an odd integer, L is the length of the cylinder and $n>k$.

JOHN P. KINZER.

REFERENCES CITED

The following references are of record in the file of this patent:

UNITED STATES PATENTS

| Number | Name | Date |
|---|---|---|
| 2,241,119 | Dallenbach | May 6, 1941 |
| 2,245,627 | Varian | June 17, 1941 |
| 2,281,550 | Barrow | May 5, 1942 |
| 2,356,414 | Linder | Aug. 22, 1944 |
| 2,362,209 | Litton | Nov. 7, 1944 |
| 2,439,388 | Hansen | Apr. 13, 1948 |